(12) United States Patent
Ahn et al.

(10) Patent No.: US 12,519,984 B2
(45) Date of Patent: Jan. 6, 2026

(54) METHOD AND APPARATUS FOR VIDEO CODING USING PRE-PROCESSING AND POST-PROCESSING

(71) Applicants: HYUNDAI MOTOR COMPANY, Seoul (KR); KIA CORPORATION, Seoul (KR); DIGITALINSIGHTS INC., Seoul (KR)

(72) Inventors: Yong Jo Ahn, Seoul (KR); Jong Seok Lee, Seoul (KR); Seung Wook Park, Yongin-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 125 days.

(21) Appl. No.: 18/375,170

(22) Filed: Sep. 29, 2023

(65) Prior Publication Data

US 2024/0031612 A1 Jan. 25, 2024

Related U.S. Application Data

(63) Continuation of application No. PCT/KR2022/004508, filed on Mar. 30, 2022.

(30) Foreign Application Priority Data

Apr. 2, 2021 (KR) .................. 10-2021-0043648
Mar. 29, 2022 (KR) .................. 10-2022-0038959

(51) Int. Cl.
*H04N 19/86* (2014.01)
*H04N 19/119* (2014.01)
(Continued)

(52) U.S. Cl.
CPC .......... *H04N 19/86* (2014.11); *H04N 19/119* (2014.11); *H04N 19/136* (2014.11);
(Continued)

(58) Field of Classification Search
CPC .. H04N 19/117; H04N 19/119; H04N 19/122; H04N 19/136; H04N 19/154;
(Continued)

(56) References Cited

U.S. PATENT DOCUMENTS 7,680,346 B2 3/2010 Han
2007/0110327 A1 5/2007 Jan
(Continued)

FOREIGN PATENT DOCUMENTS

CN 103327321 A * 9/2013 ............... H04N 7/26
CN 108521572 A * 9/2018 ........... H04N 19/107
(Continued)

OTHER PUBLICATIONS

International Search Report and Written Opinion cited in corresponding international app No. PCT/KR2022/004508; Jul. 22, 2022; 11 pp.

*Primary Examiner* — Behrooz M Senfi
(74) *Attorney, Agent, or Firm* — Lempia Summerfield Katz LLC

(57) ABSTRACT

A method and an apparatus for video coding using pre-processing and post-processing are disclosed. The video coding method and the apparatus may model a noise model or a subjective video quality model for a current video, may pre-process and post-process a video on the basis of the model, and may signal information of the model.

13 Claims, 13 Drawing Sheets

(51) Int. Cl.
*H04N 19/136* (2014.01)
*H04N 19/154* (2014.01)
*H04N 19/176* (2014.01)
*H04N 19/182* (2014.01)
*H04N 19/42* (2014.01)
*H04N 19/463* (2014.01)

(52) U.S. Cl.
CPC ......... *H04N 19/154* (2014.11); *H04N 19/176* (2014.11); *H04N 19/182* (2014.11); *H04N 19/42* (2014.11); *H04N 19/463* (2014.11)

(58) Field of Classification Search
CPC .... H04N 19/176; H04N 19/182; H04N 19/42; H04N 19/44; H04N 19/46; H04N 19/463; H04N 19/70; H04N 19/85; H04N 19/86
USPC .................................................. 375/240.24
See application file for complete search history.

(56) References Cited

U.S. PATENT DOCUMENTS

| | | | | |
|---|---|---|---|---|
| 2014/0169451 | A1* | 6/2014 | Cohen | H04N 19/50 375/240.03 |
| 2016/0353131 | A1 | 12/2016 | Kim et al. | |
| 2018/0220140 | A1 | 8/2018 | Jeong | |
| 2019/0373293 | A1* | 12/2019 | Bortman | H04N 19/176 |

FOREIGN PATENT DOCUMENTS

| | | | | |
|---|---|---|---|---|
| KR | 20070052057 | A | 5/2007 | |
| KR | 20150095591 | A | 8/2015 | |
| KR | 20190127090 | A * | 11/2019 | ............. H04N 19/85 |
| WO | WO-2013085538 | A1 * | 6/2013 | ........... H04N 19/117 |

\* cited by examiner

| 0 | 6 | 0 |
|---|---|---|
| 6 | 36 | 6 |
| 0 | 6 | 0 |

*FIG. 7*

METHOD AND APPARATUS FOR VIDEO CODING USING PRE-PROCESSING AND POST-PROCESSING

CROSS-REFERENCE TO RELATED APPLICATIONS

This application is a Continuation of International Application No. PCT/KR2022/004508 filed on Mar. 30, 2022, which claims priority to Korean Patent Application No. 10-2021-0043648 filed on Apr. 2, 2021, and Korean Patent Application No. 10-2022-0038959 filed on Mar. 29, 2022, the entire disclosures of each of which are incorporated herein by reference.

TECHNICAL FIELD

The present disclosure relates to a video encoding method and an apparatus using pre-processing and post-processing.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

For the video encoding method and apparatus, a series of processes applied to an input video before an encoder encodes the input video is defined as a pre-processing process. Further, a series of processes applied to a restored video before a decoder stores or displays the restored video is defined as a post-processing process. Meanwhile, since the input video includes noise or has an excessively high resolution, coding efficiency may be reduced or video quality may be degraded from the viewpoint of the encoder and the decoder.

Therefore, in order to improve coding efficiency and enhance video quality, it is necessary to consider effective pre-processing and post-processing processes.

SUMMARY

The present disclosure seeks to provide a video coding method and an apparatus that model a noise model or a subjective video quality model for a current video. The video coding method and the apparatus pre-process and post-process a video on the basis of the model and signal information of the model.

At least one aspect of the present disclosure provides a video decoding method performed by a video decoding apparatus. The video decoding method includes generating a restored video by decoding a bitstream and decoding parameters of a perceptual model from the bitstream. The perceptual model is a model reflecting perceptual visual characteristics in terms of perceptual quality. The video decoding method also includes generating an enhanced video by post-processing the restored video using the parameters of the perceptual model. The video decoding method also includes generating a final restored video using the enhanced video and the restored video.

Another aspect of the present disclosure provides a video decoding apparatus. The video decoding apparatus includes a decoder configured to decode a bitstream to generate a restored video. The decoder is configured to decode a perceptual model-based video quality enhancement method and parameters of a perceptual model from the bitstream. The perceptual model is a model reflecting perceptual visual characteristics in terms of perceptual quality. The video decoding apparatus also includes a perceptual quality enhancer configured to post-process the restored video using the perceptual model-based video quality enhancement method to generate an enhanced video. The video decoding apparatus also includes an adder configured to generate a final restored video using the enhanced video and the restored video.

Yet another aspect of the present disclosure provides a video encoding method performed by a video encoding apparatus. The video encoding method includes determining removable elements according to a perceptual model by analyzing an input video in terms of perceptual quality. The perceptual model is a model reflecting perceptual visual characteristics in terms of perceptual quality. The video encoding method also includes estimating parameters of the perceptual model. The video encoding method also includes pre-processing the input video by removing the removable elements from the input video using the parameters of the perceptual model. The video encoding method also includes generating a bitstream by encoding the pre-processed input video. The video encoding method also includes encoding the parameters of the perceptual model and combining the encoded parameters with the bitstream.

As described above, the present disclosure provides a video coding method and an apparatus for modeling a noise model or a subjective video quality model for a current video. The video coding method and the apparatus may pre-process and post-process a video on the basis of the model and may signal information of the model to improve coding efficiency and enhance video quality.

BRIEF DESCRIPTION OF THE DRAWINGS

FIG. 7 is an illustrative diagram illustrating a bilateral filter used for pre-processing and post-processing according to an embodiment of the present disclosure.

DETAILED DESCRIPTION

Figure 1:
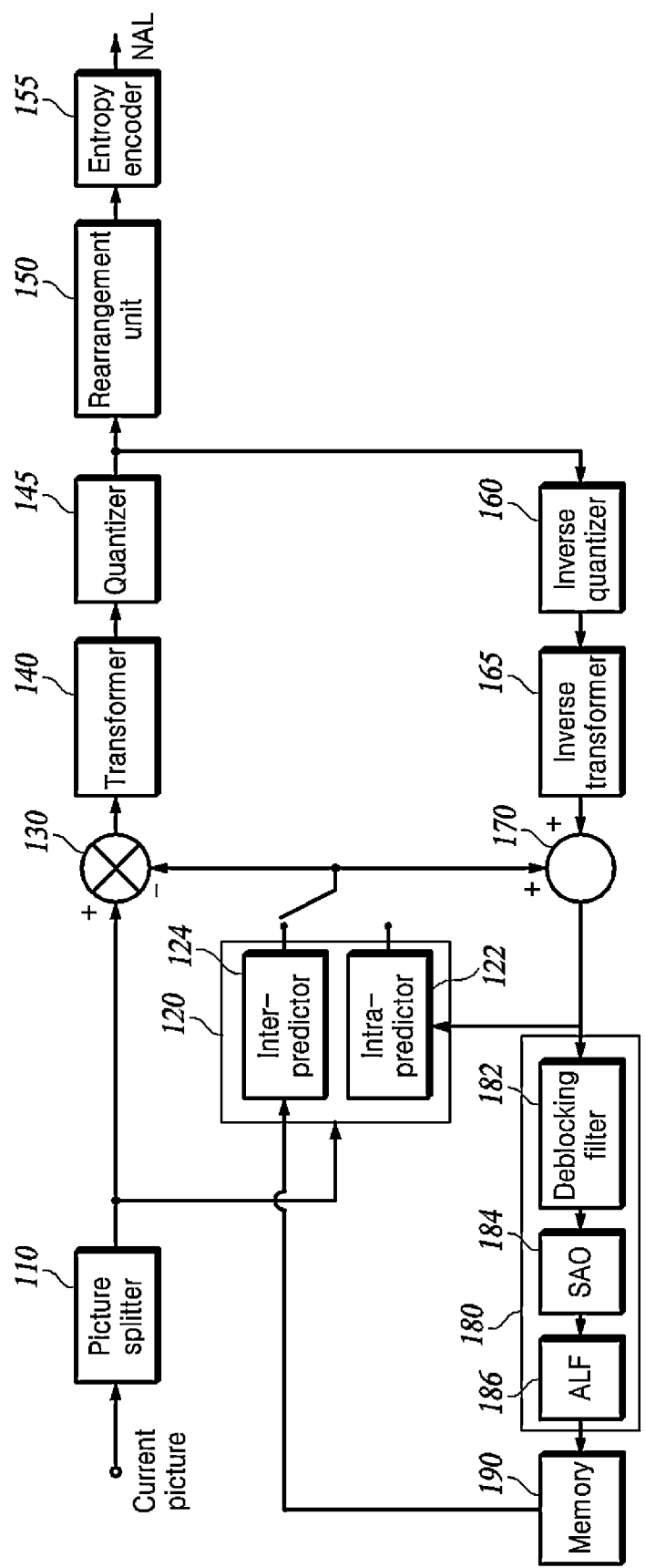
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
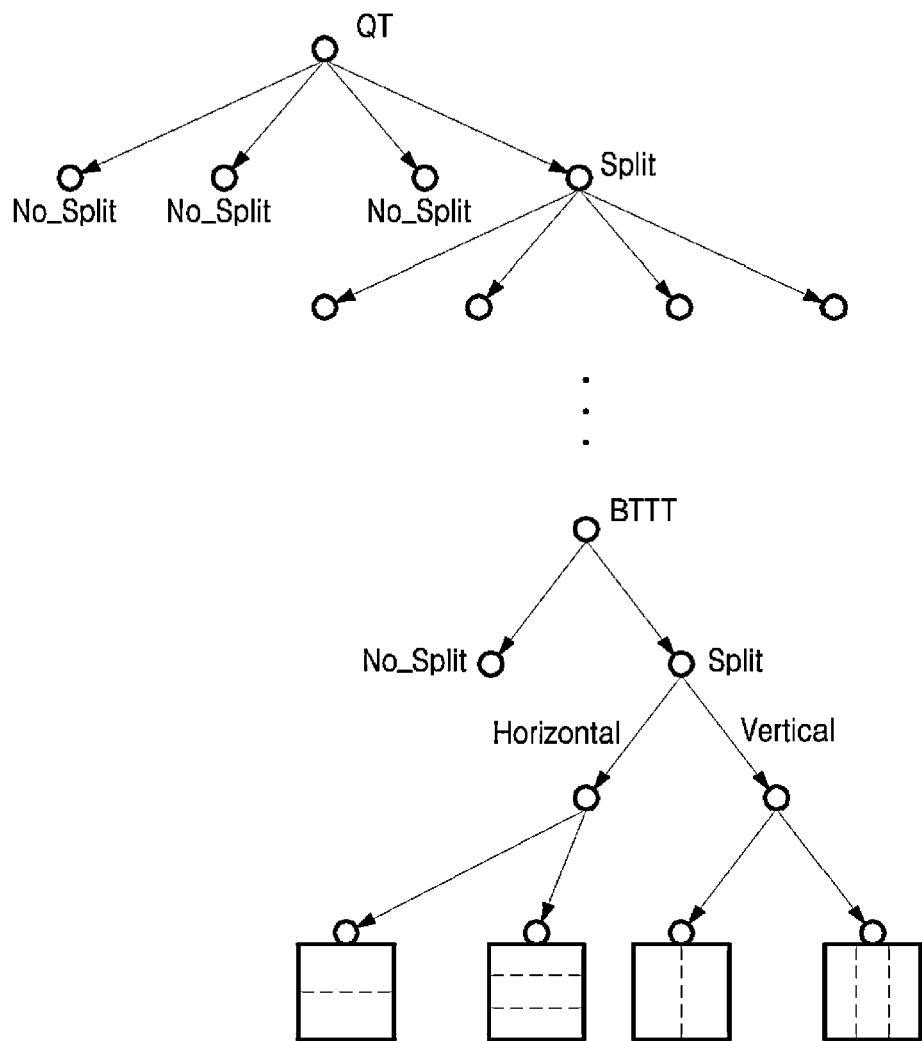
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
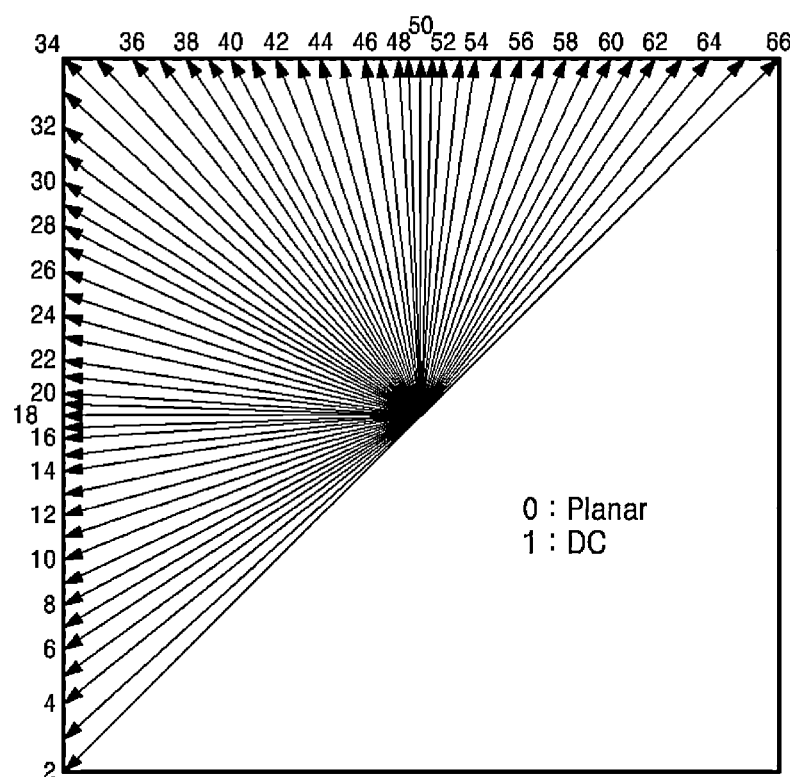
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
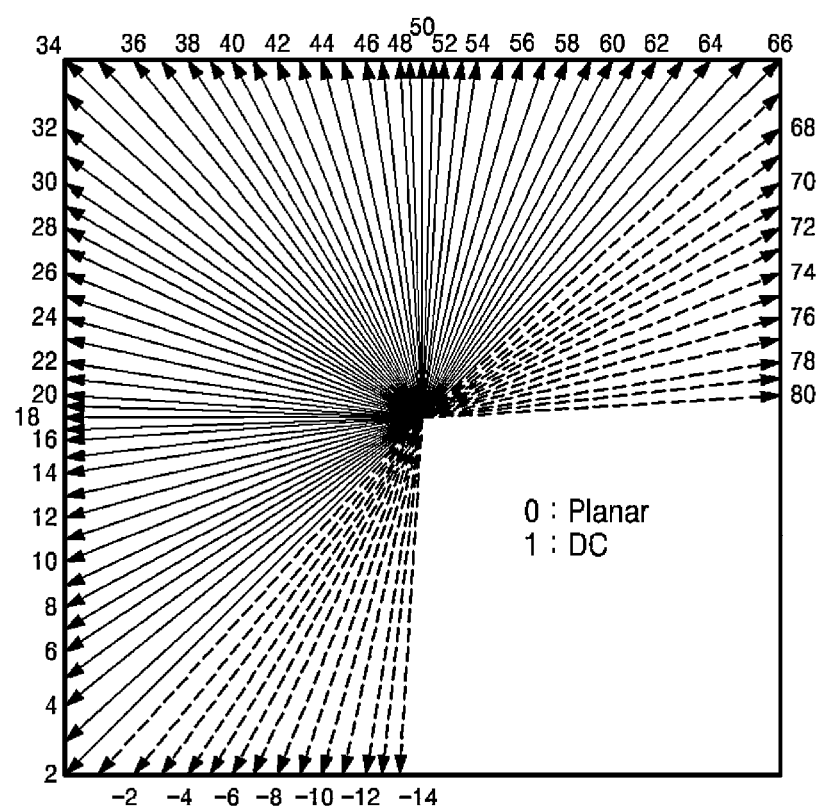

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
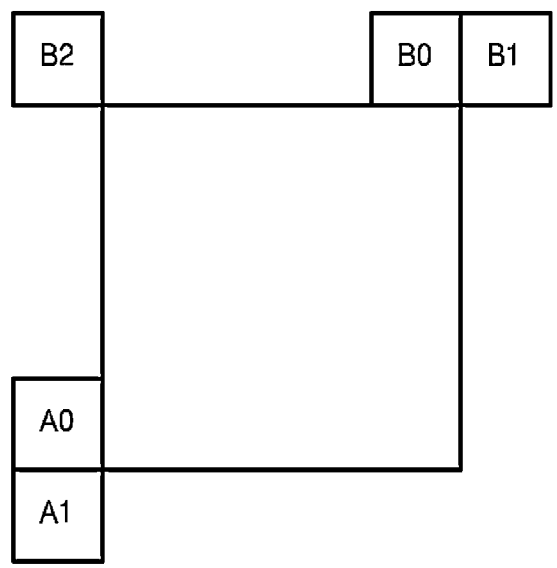
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_jdx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
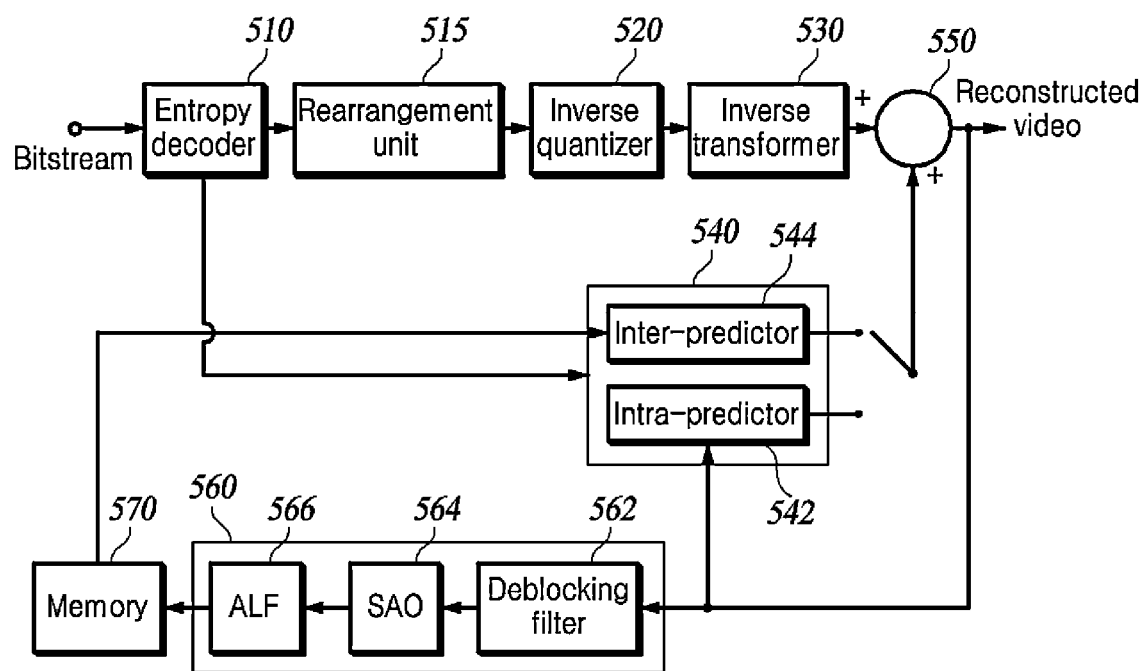
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus for modeling a noise model or a subjective video quality model for a current video, for pre-processing and post-processing a video on the basis of the model, and for signaling information of the model are provided.

In the following description, for convenience, an example of FIG. 1 shows an encoder, and an example of FIG. 5 shows a decoder in order to express that the video encoding/decoding apparatus includes pre-processing and post-processing. Accordingly, the video encoding apparatus may include components that perform the pre-processing process, and the video encoding apparatus may include an encoder. The video decoding apparatus may include components that perform the post-processing, and the video decoding apparatus may include a decoder.

<Example 1> Pre-Processing/Post-Processing Method Using Noise Model

Figure 6:
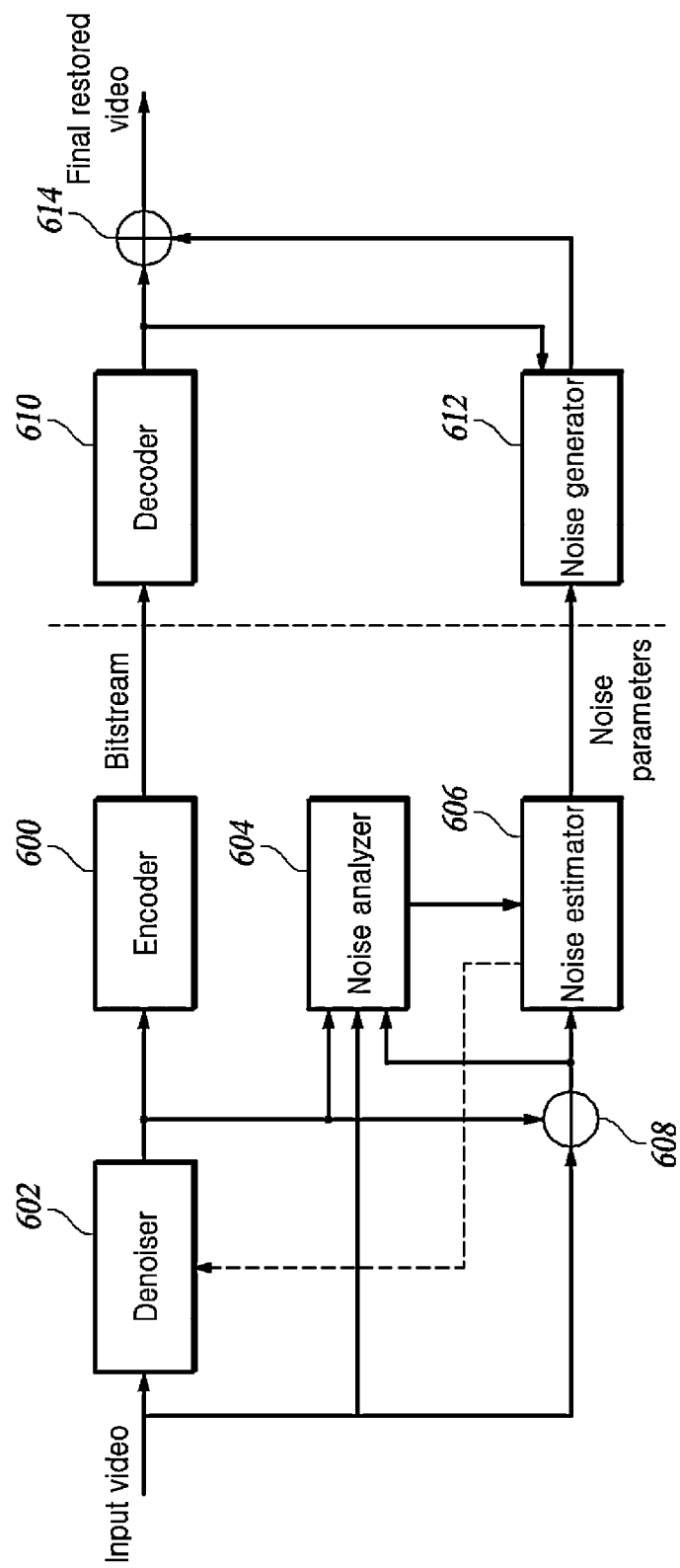
FIG. 6 is an illustrative diagram illustrating a video encoding apparatus and a video decoding apparatus including pre-processing and post-processing according to an embodiment of the present disclosure.

FIG. 6 is an illustrative diagram illustrating a video encoding apparatus and a video decoding apparatus including pre-processing and post-processing according to an embodiment of the present disclosure.

The video encoding apparatus pre-processes noise of the input video, encodes the input video of which the noise has been pre-processed to generate a bitstream, and then transfers the bitstream to the video decoding apparatus. The video encoding apparatus includes all or some of an encoder 600, a denoiser 602, a noise analyzer 604, a noise estimator 606, and a differencer 608. The video decoding apparatus may generate a restored video from the bitstream and may apply post-processed noise to the restored video. The video decoding apparatus includes all or some of a decoder 610, a noise generator 612, and an adder 614.

Hereinafter, an operation of the video encoding apparatus as illustrated in FIG. 6 is described.

The denoiser 602 removes noise added to the input video before the video is input to the encoder 600 to generate a denoised video. The denoiser 602 may use a denoising method corresponding to characteristics of the noise added to the input video on the basis of analysis of the input video.

Alternatively, the denoiser 602 may use a method of removing noise using a predefined pixel operation without analyzing a type of noise added to the input video. In this case, the predefined pixel operation may mean various types of filtering methods, such as low-pass filtering, bilateral filtering, and bi-linear filtering. The denoiser 602 may selectively use one of these various types of filtering methods. In particular, in the bilateral filtering, a weight may depend on a difference in a pixel value, in addition to the spatial distances of the pixels, unlike an FIR filter that uses a weight dependent on spatial distances of pixels in the related art. The bilateral filtering is a representative example of filtering methods that play a role of preserving a meaningful boundary even when filtering is performed at a boundary of an object in a video. Hereinafter, the present embodiment proposes a method and apparatus for effectively removing noise by performing bilateral filtering on an input video before the input video is input to the encoder 600.

The denoiser 602 provides the denoised video to the encoder 600 as an input. Also, the denoiser 602 may provide the denoised video to the noise analyzer 604.

The noise analyzer 604 may acquire two channels including an original input video and a denoised video, as inputs. Alternatively, the noise analyzer 604 may acquire, as an input, a difference video between the original input video and the denoised video. In this case, the difference video may be generated by the differencer 608.

The noise analyzer 604 analyzes the two channels or the difference video to analyze characteristics of the noise removed from the original input video. Here, the characteristics of the noise may be a Gaussian distribution, a uniform distribution, or the like.

The noise estimator 606 reflects the characteristics of the noise analyzed by the noise analyzer 604 to generate parameters of the noise removed from the original input video. Further, the noise parameters may include a noise generation method corresponding to the noise characteristics. Here, the noise generation method may be used in the video decoding apparatus later. As another embodiment, the noise generation method may be agreed in advance between the video encoding apparatus and the video decoding apparatus according to the noise characteristics.

Meanwhile, the noise parameters are provided to the denoiser 602, and the denoiser 602 may use the denoising method corresponding to the characteristics of the noise.

The encoder 600 encodes the denoised video to generate a bitstream. In this case, the bitstream may include a result of encoding the noise parameters. The video encoding apparatus may transmit the bitstream to the video decoding apparatus.

Hereinafter, an operation of the video decoding apparatus as illustrated in FIG. 6 is described.

The decoder 610 generates a restored video from the bitstream. As described above, the bitstream may include noise parameters generated by the video encoding apparatus.

Meanwhile, the noise parameters may be transmitted from the video encoding apparatus to the video decoding apparatus with the noise parameters included in an independent bitstream, such as supplemental enhancement information (SEI) or video usability information (VUI).

The decoded noise parameters are provided to the noise generator 612. As described above, the noise parameters may include a noise generation method. Alternatively, a noise generation method agreed in advance between the video encoding apparatus and the video decoding apparatus may be used.

The noise generator 612 generates noise on the basis of the noise parameters using the noise generation method.

The video decoding apparatus may generate a final restored video using the generated noise and the restored video. In this case, as illustrated in FIG. 6, noise may be added to the restored video in the form of an offset by the adder 614. Alternatively, predefined filtering is applied to the restored video to generate a final restored video, so that noise can be added.

Figure 7:
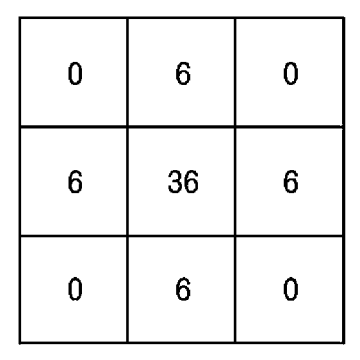

FIG. 7 is an illustrative diagram illustrating a bilateral filter used for pre-processing and post-processing according to an embodiment of the present disclosure.

As an example, the bilateral filter may be a 3×3 filter, as illustrated in FIG. 7. Alternatively, a 5×5 filter, a 7×7 filter, and the like may also be used in addition to the 3×3 filter.

Meanwhile, for a bilateral filter having a size of 3×3, filter coefficients may be composed of weights calculated at each position. As an embodiment, a weight of the bilateral filter may be expressed as Equation 1.

$$w(i, j, k, m) = \exp(-(\frac{(i-k)^2 + (j-m)^2}{2\sigma_d^2} + \frac{\|I(i, j) - I(k, m)\|^2}{2\sigma_r^2}))$$ [Equation 1]

Here, the first term of the exponential function is determined by using the spatial distance of the pixel, and the second term is determined by a brightness value of each pixel, i.e., a difference in pixel values at each position.

In Equation 1, the weight w(i, j, k, m) of the bilateral filter represents a weight to be applied to a pixel at a position (k, m) in order to apply the filter to a pixel at a position (i, j). Accordingly, as illustrated in FIG. 7, the weight value is the largest at a center of the bilateral filter corresponding to i=k and j=m.

Further, a value of $\sigma_d$ in the first term of the exponential function may be determined according to a size of a current block and may be a different value according to a scheme of encoding the current block, i.e., intra prediction or inter prediction. A value of $\sigma_r$ in the second term of the exponential function may be determined by a quantization parameter of the current block.

These sigma values may be directly calculated in the video encoding apparatus and the video decoding apparatus according to Equation 1. Alternatively, the values may be signaled from the video encoding apparatus to the video decoding apparatus with the values encoded with specific syntax information in the bitstream. Also, as a size of a filter applied to pixels in a block according to the weight of the bilateral filter, one of 3×3, 5×5, and 7×7 as described above may be selected and then used.

<Example 2> Perceptual
Pre-Processing/Post-Processing Method

Figure 8:
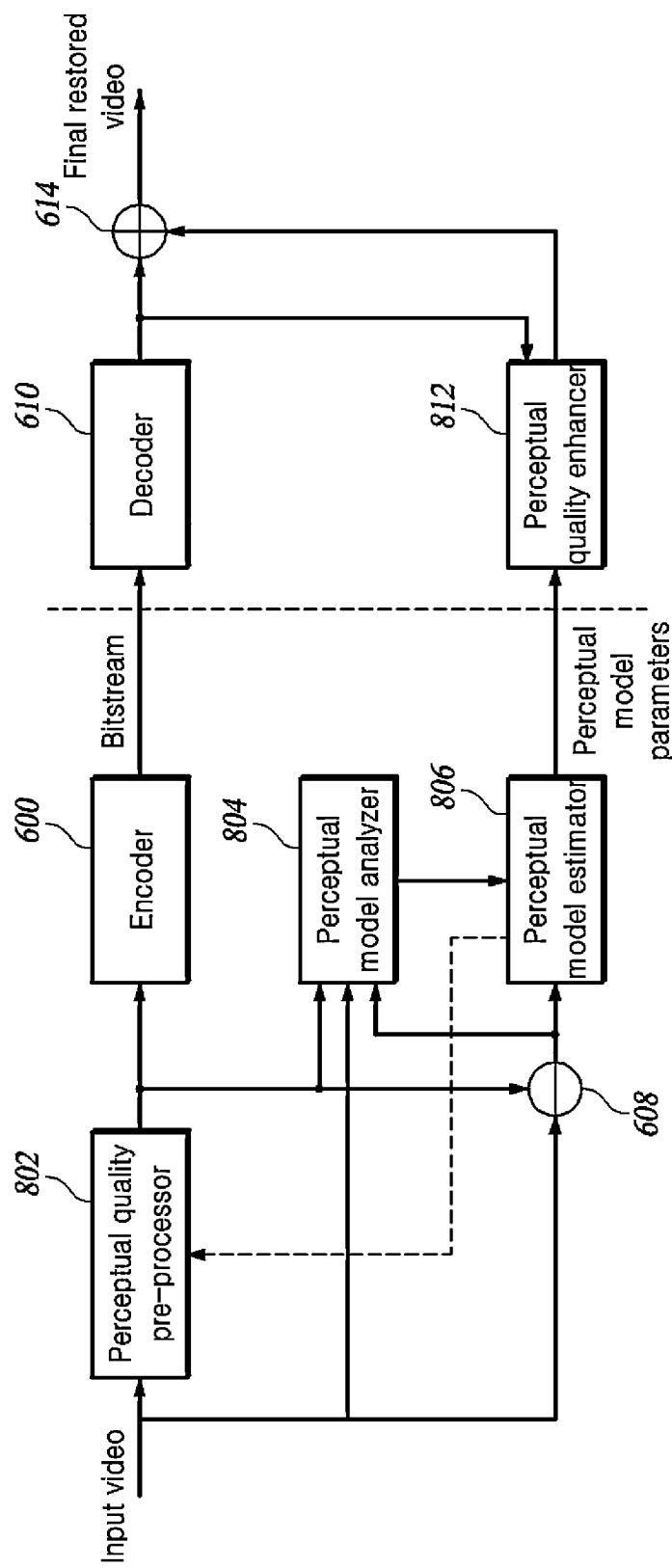
FIG. 8 is an illustrative diagram illustrating the video encoding apparatus and the video decoding apparatus including pre-processing and post-processing according to another embodiment of the present disclosure.

FIG. 8 is an illustrative diagram illustrating the video encoding apparatus and the video decoding apparatus including pre-processing and post-processing according to another embodiment of the present disclosure.

The video encoding apparatus analyzes the input video, removes perceptually removable elements from the video, encodes the input video from which these elements have been removed, to generate a bitstream. The video encoding apparatus transfers the bitstream to the video decoding apparatus. The video encoding apparatus includes all or some of an encoder 600, a perceptual quality pre-processor 802, a perceptual model analyzer 804, a perceptual model estimator 806, and a differencer 608. The video decoding apparatus generates a restored video from the bitstream and then post-processes the restored video to improve subjective video quality. The video decoding apparatus includes all or some of a decoder 610, a perceptual quality enhancer 812, or an adder 614.

Hereinafter, an operation of the video encoding apparatus as illustrated in FIG. 8 is described.

Before the video is input to the encoder 600, the perceptual quality pre-processor 802 removes the perceptually removable elements added to the input video to generate a video from which the removable elements have been removed. The perceptual quality pre-processor 802 analyzes the input video on the basis of various subjective video quality measurement models and removes the removable elements. Further, the perceptual quality pre-processor 802 may remove elements determined to improve coding efficiency when removed.

In this case, the perceptually removable elements mean change elements that are not recognizable in a human visual system when visual characteristics of the human are considered. Examples of such perceptual visual characteristics include a contrast sensitivity function (CSF) effect, a contrast masking (CM) or texture masking (TM) effect, and a luminance adaptation (LA) effect.

The CSF effect means that characteristics of a perceptual visual system of humans exhibit characteristics such as a band pass filter in a frequency axis. The CSF effect can be classified into a spatial contrast sensitivity function effect and a temporal contrast sensitivity function effect according to a type of frequency axis.

The CM or TM effect represents a characteristic that visual characteristics of a video are modified according to a mask. For example, a visual system of humans exhibits characteristics that the visibility of distortion is degraded in a high texture area, and distortion can be easily recognized in a flat area or near a boundary.

The LA effect refers to a characteristic that distortion is not easily recognized compared to a luminance area with medium brightness in a dark or bright luminance area.

Meanwhile, there are various perceptual models that reflect the perceptual visual characteristics in terms of perceptual quality and reflect these characteristics in a video. A just noticeable distortion (JND) model is a representative perceptual model. Here, the JND represents a minimum error that humans begin to perceive visually. The present realization example proposes a method and an apparatus for removing unperceivable error elements in terms of subjective video quality using the perceptual quality pre-processor 802. As an example, the perceptual quality pre-processor 802 may remove the unperceivable error elements on the basis of the above-described JND model.

The perceptual quality pre-processor 802 provides the video from which the unperceivable error elements have been removed, as an input, to the encoder 600. Further, the perceptual quality pre-processor 802 may provide the perceptual model analyzer 804 with the video from which the unperceivable error elements have been removed.

The perceptual model analyzer 804 may acquire, as inputs, two channels including the original input video and the video from which the unrecognizable error elements have been removed. Alternatively, the perceptual model analyzer 804 may acquire, as an input, a difference video between the original input video and the video from which the unperceivable error elements have been removed. In this case, the difference video may be generated by the differencer 608.

The perceptual model analyzer 804 predicts whether or not there are perceptually removable elements in the original input video, and the perceptual model analyzer 804 predicts improvement of coding efficiency when the removable elements are removed. Further, the perceptual model analyzer 804 analyzes the two channels or the difference video to ascertain characteristics of the unperceivable error elements removed from the original input video.

Depending on the characteristics of the unperceivable error elements, the perceptual model analyzer 804 may determine a dominant characteristic among the above-described perceptual visual characteristics and may select a model suitable for correspondence to the dominant characteristic as a perceptual model. As described above, the JND model can be selected as the perceptual model.

The perceptual model estimator 806 generates the parameters of the perceptual model selected by the perceptual model analyzer 804. For example, when the perceptual model is the JND model, the perceptual model estimator 806 may obtain a threshold value of a pixel value of the input video in terms of perceptual quality. Here, the threshold value represents a maximum value to which the pixel value of the input video can be changed in terms of perceptual quality. The perceptual model parameters may include such a threshold value.

Further, the perceptual model estimator 806 may select a video quality compensation method corresponding to the perceptual model and may include the video quality compensation method as the perceptual model parameters. Here, the video quality compensation method may be used in the video decoding apparatus later. As another embodiment, the video quality compensating method may be agreed between the video encoding apparatus and the video decoding apparatus in advance according to the perceptual visual characteristics.

Meanwhile, the perceptual model parameters may be provided to the perceptual quality pre-processor 802. The perceptual quality pre-processor 802 may generate a video from which perceptually removable elements have been removed from the input video, using the method corresponding to the perceptual model. For example, when the perceptual model is a JND model, the perceptual quality pre-processor 802 may apply an operation to the input video within the above-described threshold value limit. Here, the operation may be filtering, convolutional operation, or change of a pixel value using an offset.

The encoder 600 encodes the pre-processed input video to generate a bitstream. In this case, the bitstream may include the parameters of the perceptual model. The video encoding apparatus may transmit the bitstream to the video decoding apparatus.

Hereinafter, an operation of the video decoding apparatus as illustrated in FIG. 8 is described.

The decoder 610 generates a restored video from the bitstream. As described above, the bitstream may include the parameters of the perceptual model generated by the video encoding apparatus.

Meanwhile, the perceptual model parameters may be transmitted from the video encoding apparatus to the video decoding apparatus with the perceptual model parameters included in an independent bitstream such as SEI or VUI.

The decoded parameters of the perceptual model is provided to the perceptual quality enhancer 812. As described above, the parameters of the perceptual model may include the video quality enhancement method. Alternatively, a video quality enhancement method agreed between the video encoding apparatus and the video decoding apparatus in advance may be used. When the perceptual model is the JND model, the perceptual model parameters may include a threshold value to which a pixel value of the restored video can be changed in terms of perceptual quality.

The perceptual quality enhancer 812 post-processes the restored video on the basis of the perceptual model parameters to generate an enhanced video, in order to improve the subjective video quality of the restored video. When the perceptual model is the JND model, the perceptual quality enhancer 812 may apply an operation to the restored video according to the video quality compensation method within the above-described threshold value limit. Here, the operation may be filtering, convolution operation, or change of a pixel value using an offset.

The perceptual quality enhancer 812 may evaluate the perceptually deteriorating portions and then, may enhance video quality to generate an enhanced video. In this case, the perceptual quality enhancer 812 may split the restored video into N×N square blocks and post-process the restored video per N×N square block basis. In other words, the perceptual quality enhancer 812 may apply a single perceptual model to the entire restored video to evaluate perceptual deterioration and may enhance video quality, or the perceptual quality enhancer 812 may split the restored video into a plurality of blocks and may perform post-processing per block basis.

The video decoding apparatus may generate a final restored video using the generated enhanced video and the restored video. In this case, as illustrated in FIG. 8, the enhanced video may be added to the restored video in the form of an offset by the adder 614. Alternatively, the enhanced video generated by the perceptual quality enhancer 812 may be the final restored video.

Figure 9:
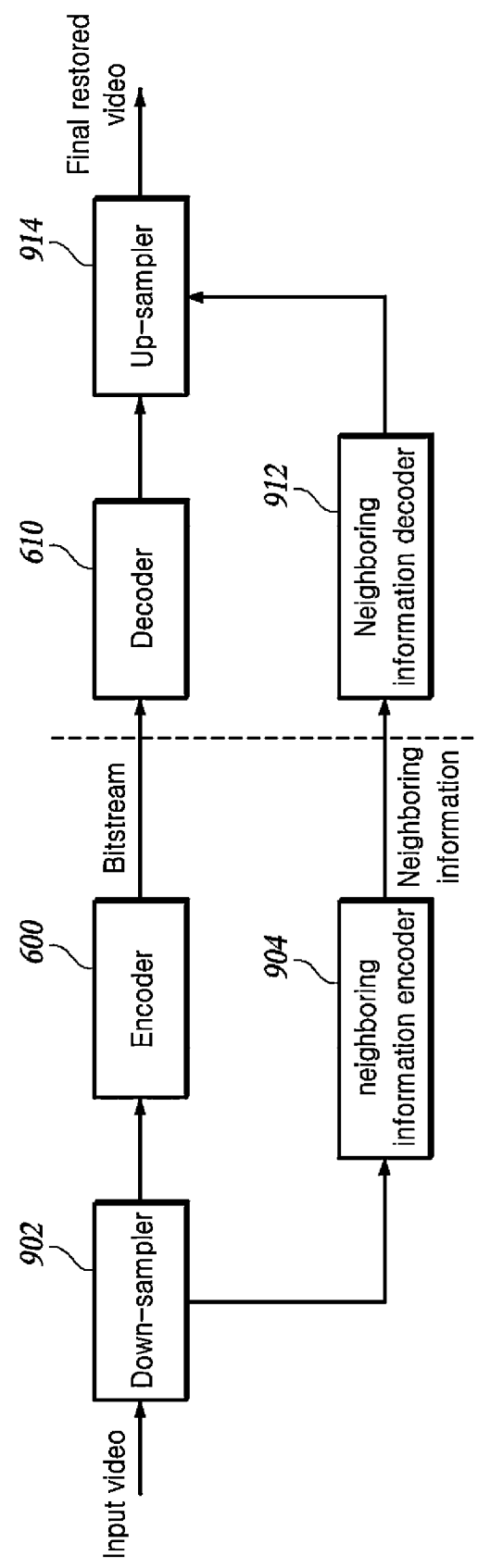
FIG. 9 is an illustrative diagram illustrating a video encoding apparatus and a video decoding apparatus including pre-processing and post-processing according to another embodiment of the present disclosure.

<Example 3> Pre-Processing/Post-Processing Method Using Down-Sampling and Up-Sampling FIG. 9 is an illustrative diagram illustrating a video encoding apparatus and a video decoding apparatus including pre-processing and post-processing according to another embodiment of the present disclosure.

The video encoding apparatus reduces the resolution of the input video, encodes the input video with the reduced resolution to generate a bitstream, and then transfers the bitstream to the video decoding apparatus. The video encoding apparatus includes all or some of the encoder 600, a down-sampler 902, or a neighboring information encoder 904. The video decoding apparatus may generate a restored video from the bitstream and then may up-sample the restored video. The video decoding apparatus includes all or some of the decoder 610, a neighboring information decoder 912, or an up-sampler 914.

Hereinafter, an operation of the video encoding apparatus as illustrated in FIG. 9 is described.

The down-sampler 902 reduces the resolution of the input video before the video is input to the encoder 600. In other words, the down-sampler 902 performs a resolution reduction operation using a down-sampling filter to convert the input video into a video having a width and a height of ½ or ¼. For example, unlike a method of encoding a 4K video having a resolution of 3840×2160 in the related art, the present realization example down-samples a 3840×2160 video into a 1920×1080 video by performing down-sampling and uses the down-sampled video as an input for encoding. When the encoder 600 is operated by performing such down-sampling, coding efficiency can be improved.

The neighboring information encoder 904 encodes the type of down-sampling operation used upon down-sampling the original video by the down-sampler 902 and down-sampling information, i.e., the down-sampling parameters to generates a bitstream. Here, the down-sampling operation represents a down-sampling filter used when down-sampling is performed, and the down-sampling information represents a video ratio between the original video and the down-sampled video. The neighboring information encoder 904 encodes the down-sampling parameters into syntax elements. Also, when cropping is applied to the original video, the neighboring information encoder 904 may additionally encode information on a cropping operation performed before down-sampling into the syntax elements.

Hereinafter, an operation of the video decoding apparatus as illustrated in FIG. 9 is described.

The decoder 610 generates a restored video from the bitstream. As described above, the bitstream may include the down-sampling parameters generated by the video encoding apparatus.

Meanwhile, the down-sampling parameters may be transmitted from the video encoding apparatus to the video decoding apparatus with the down-sampling parameters included in an independent bitstream such as SEI or VUI. The bitstream including the down-sampling parameters is provided to the neighboring information decoder 912.

The neighboring information decoder 912 decodes the down-sampling parameters from the bitstream. Further, the neighboring information decoder 912 acquires up-sampling information for up-sampling the restored video with the resolution of the original video on the basis of the down-sampling parameters. Here, the up-sampling information may include an up-sampling filter used when up-sampling is performed, and the up-sampling information may include a video ratio between the down-sampled restored video and the original video.

The up-sampler 914 generates a final restored video having the resolution of the original video from the restored video on the basis of the up-sampling information.

As another embodiment, the up-sampler 914 may perform super resolution (SR) to up-sample the restored video with the resolution of the original video. Thus, the up-sampler 914 may use a deep learning-based neural network to perform SR. In this case, the neural network for SR may be composed of a combination of a plurality of convolutional layers, pooling layers, activation function layers, or the like.

Hereinafter, a video encoding method and a video decoding method according to Example 1 are described using the illustrations of FIGS. 10 and 11.

Figure 10:
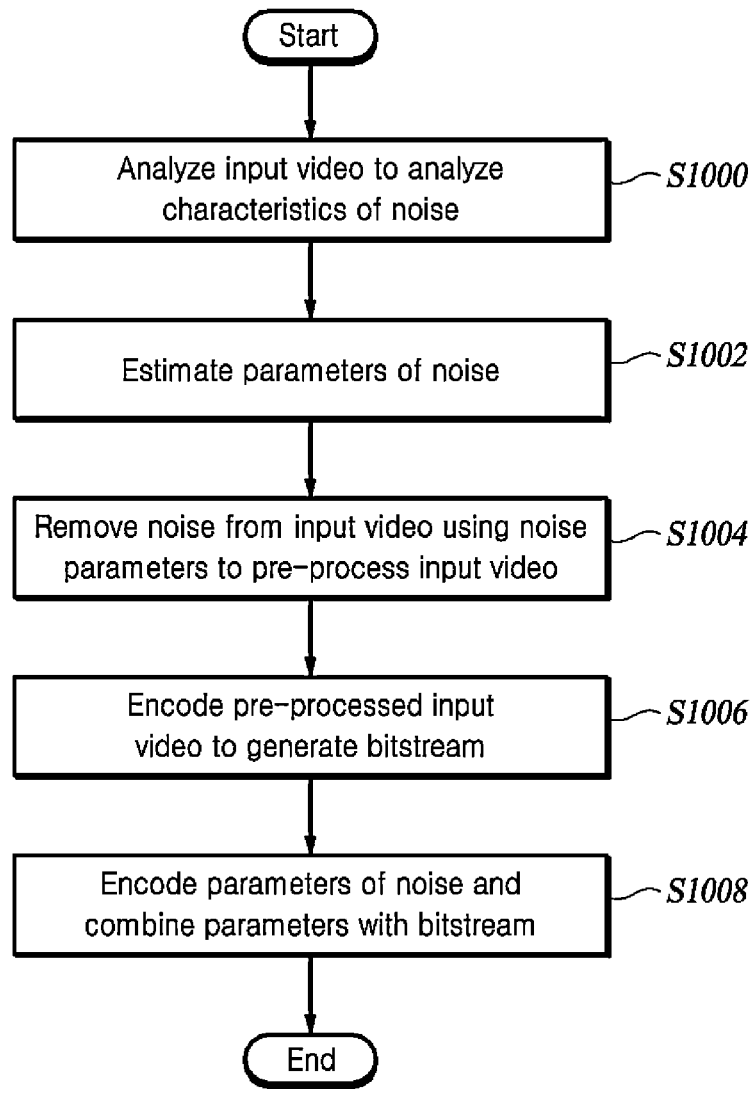
FIG. 10 is an illustrative diagram illustrating a video encoding method including pre-processing according to an embodiment of the present disclosure.

FIG. 10 is an illustrative diagram illustrating a video encoding method including pre-processing according to an embodiment of the present disclosure.

The video encoding apparatus analyzes the input video to analyze the characteristics of noise (S1000). Here, the characteristic of the noise may be a Gaussian distribution or a uniform distribution.

The video encoding apparatus estimates parameters of the noise (S1002). The video encoding apparatus reflects the characteristics of the analyzed noise to generate a parameters of the noise removed from the original input video. Further, the noise parameters may include a noise generation method corresponding to the noise characteristics. Here, the noise generation method may be used in the video decoding apparatus later. As another embodiment, the noise generation method may be agreed in advance between the video encoding apparatus and the video decoding apparatus according to the noise characteristics.

The video encoding apparatus removes the noise from the input video using the noise parameters to pre-process the input video (S1004). The video encoding apparatus may use a denoising method corresponding to the characteristics of the noise added to the input video on the basis of the analysis of the input video.

Alternatively, a method of removing noise added to an input video using a predefined pixel operation without analyzing a type of noise may be used. In this case, the predefined pixel operation may mean various types of filtering methods, such as low-pass filtering, bilateral filtering, and bilinear filtering. The video encoding apparatus may selectively use one of the various types of filtering methods.

The video encoding apparatus encodes the pre-processed input video to generate a bitstream (S1006).

The video encoding apparatus encodes the parameters of the noise and combines the encoded parameters with the bitstream (S1008). The video encoding apparatus may transmit the bitstream to the video decoding apparatus.

Figure 11:
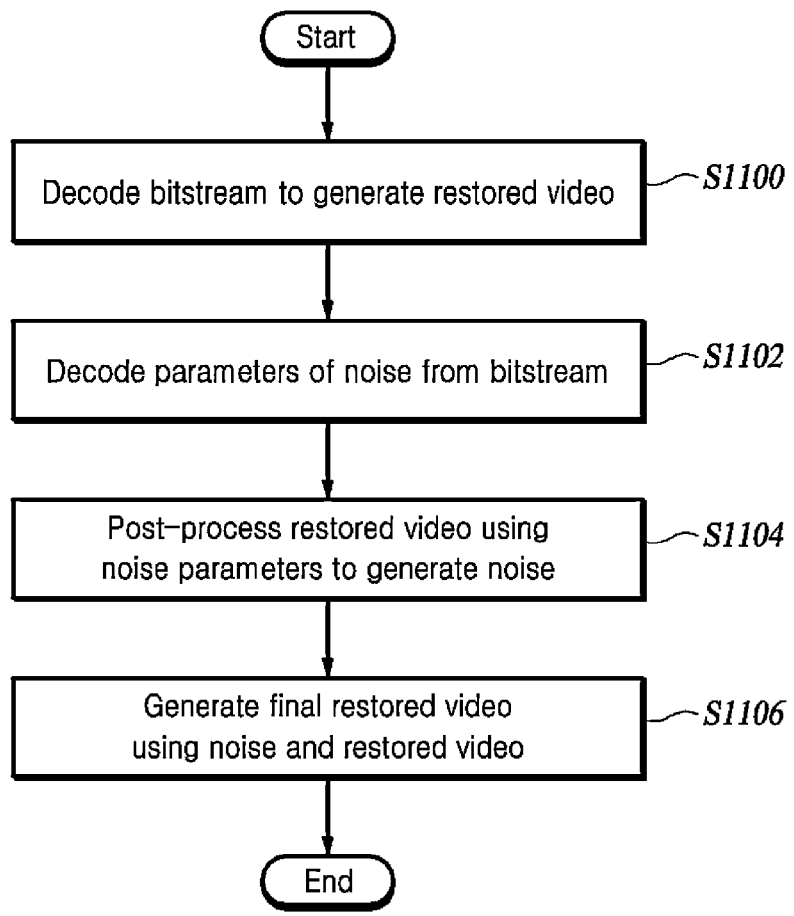
FIG. 11 is an illustrative diagram illustrating a video decoding method including post-processing according to an embodiment of the present disclosure.

FIG. 11 is an illustrative diagram illustrating a video decoding method including post-processing according to an embodiment of the present disclosure.

The video decoding apparatus decodes the bitstream to generate a restored video (S1100)

The video decoding apparatus decodes the parameters of the noise from the bitstream (S1102). As described above, the noise parameters may include the noise generation method. Alternatively, a noise generation method agreed in advance between the video encoding apparatus and the video decoding apparatus may be used.

Meanwhile, the noise parameters may be transmitted from the video encoding apparatus to the video decoding apparatus with the noise parameters included in an independent bitstream such as SEI or VUI.

The video decoding apparatus post-processes the restored video using the noise parameters to generate noise (S1104).

The video decoding apparatus generates a final restored video using the noise and the restored video (S1106). For example, the noise may be added to the restored video in the form of an offset. Alternatively, the noise may be added by applying predefined filtering to the restored video to generate the final restored video.

Hereinafter, a video encoding method and a video decoding method according to Example 2 are described using the illustrations of FIGS. 12 and 13.

Figure 12:
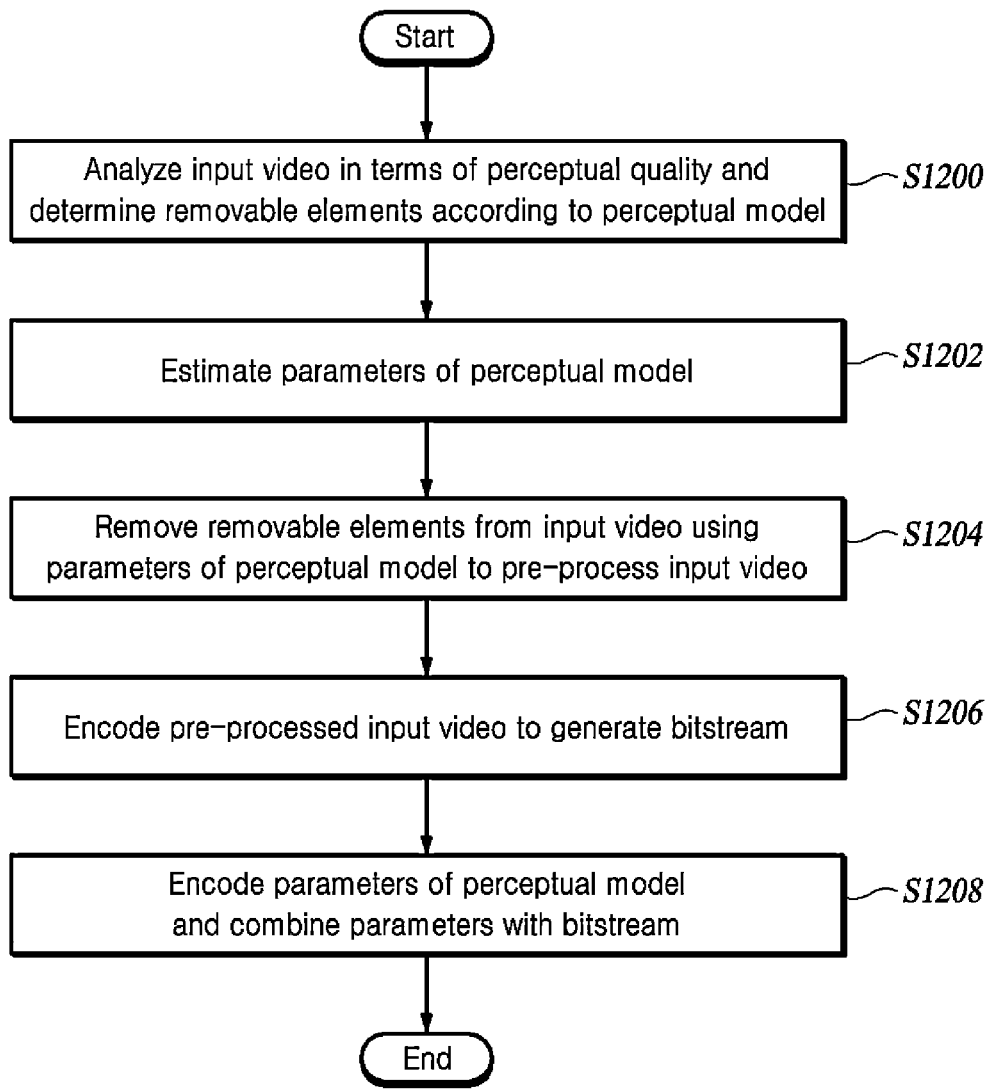
FIG. 12 is an illustrative diagram illustrating a video encoding method including pre-processing according to another embodiment of the present disclosure.

FIG. 12 is an illustrative diagram illustrating a video encoding method including pre-processing according to another embodiment of the present disclosure.

The video encoding apparatus analyzes the input video in terms of perceptual quality and determines removable elements according to the perceptual model (S1200). Here, the perceptually removable elements mean change elements that are not recognizable in a human visual system when visual characteristics of the human are considered. Examples of such perceptual visual characteristics include a CSF effect, a CM or TM effect, and a LA effect.

Meanwhile, the perceptual model is a model that reflects perceptual visual characteristics in terms of perceptual quality. The JND model is a representative perceptual model. Here, the JND represents a minimum error that humans begin to perceive visually.

The video encoding apparatus estimates the parameters of the perceptual model (S1202). For example, when the perceptual model is the JND model, the video encoding apparatus may obtain the threshold value of the pixel value of the input video in terms of perceptual quality. Here, the threshold value represents a maximum value to which the pixel value of the input video can be changed in terms of perceptual quality. The perceptual model parameters may include such a threshold value.

Further, the video encoding apparatus may select the video quality compensation method corresponding to the perceptual model and may include the video quality compensation method as the perceptual model parameters. Here, the video quality compensation method may be used in the video decoding apparatus later. As another embodiment, the video quality compensating method may be agreed between the video encoding apparatus and the video decoding apparatus in advance according to perceptual visual characteristics.

The video encoding apparatus removes removable elements from the input video using the parameters of the perceptual model to pre-process the input video (S1204).

The video encoding apparatus may generate a video from which perceptually removable elements have been removed from the input video using a method corresponding to the perceptual model. For example, when the perceptual model is the JND model, the video encoding apparatus may apply an operation to the input video within the above-described threshold value limit. Here, the operation may be filtering, convolution operation, or change of a pixel value using an offset.

The video encoding apparatus encodes the pre-processed input video to generate a bitstream (S1206).

The video encoding apparatus encodes the parameters of the perceptual model and combines the encoded parameters of the perceptual model with the bitstream (S1208). The video encoding apparatus may transmit the bitstream to the video decoding apparatus.

Figure 13:
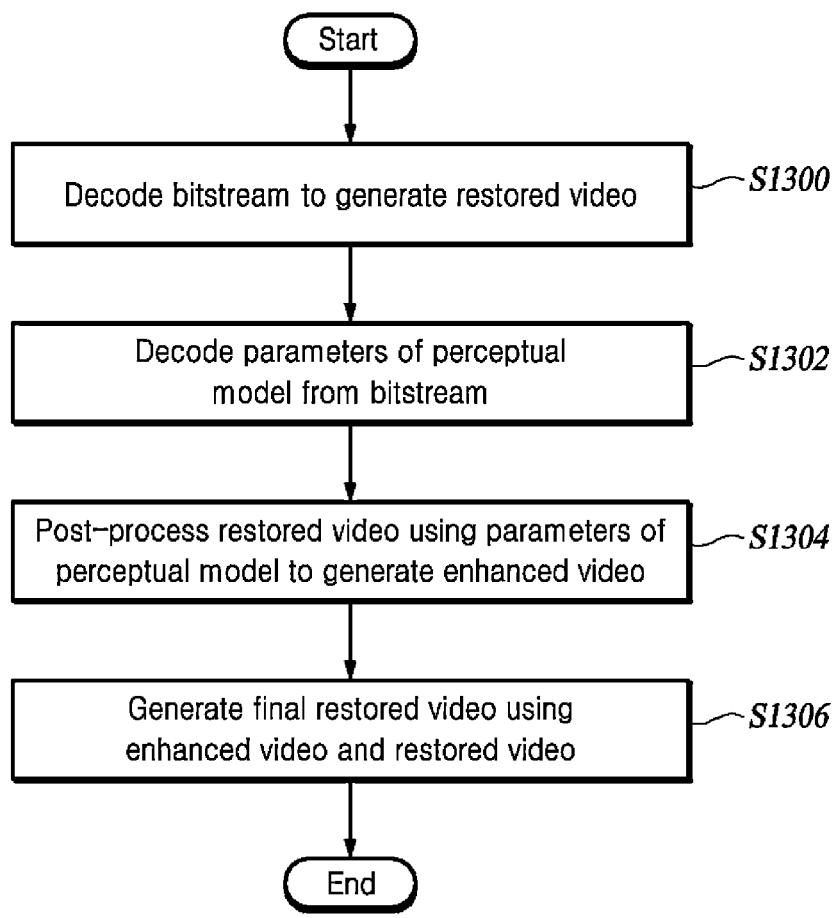
FIG. 13 is an illustrative diagram illustrating a video decoding method including post-processing according to another embodiment of the present disclosure.

FIG. 13 is an illustrative diagram illustrating a video decoding method including post-processing according to another embodiment of the present disclosure.

The video decoding apparatus decodes the bitstream to generate a restored video (S1300)

The video decoding apparatus decodes the parameters of the perceptual model from the bitstream (S1302). Here, the perceptual model is a model that reflects perceptual visual characteristics in terms of perceptual quality.

Meanwhile, the perceptual model parameters may be transmitted from the video encoding apparatus to the video decoding apparatus with the perceptual model parameters included in an independent bitstream, such as SEI or VUI.

Meanwhile, the perceptual model parameters may include a video quality enhancement method. Alternatively, a video quality enhancement method agreed between the video encoding apparatus and the video decoding apparatus in advance may be used. When the perceptual model is the JND model, the perceptual model parameters may include a threshold value to which a pixel value of the restored video can be changed in terms of perceptual quality.

The video decoding apparatus post-processes the restored video using the parameters of the perceptual model to generate an enhanced video (S1304).

When the perceptual model is the JND model, the video decoding apparatus may apply an operation to the restored video according to the video quality compensation method within the above-described threshold value limit. Here, the operation may be filtering, convolution operation, or change of a pixel value using an offset.

Alternatively, the video decoding apparatus may evaluate the perceptually deteriorating portions and then may enhance video quality to generate an enhanced video. In this case, the video decoding apparatus may split the restored video into N×N square blocks and post-process the restored video per N×N square block basis. In other words, the video decoding apparatus may apply a single perceptual model to the entire restored video to evaluate perceptual deterioration and enhance video quality or may split the restored video into a plurality of blocks and perform post-processing per block basis.

The video decoding apparatus generates a final restored video using the enhanced video and the restored video (S1306). The video decoding apparatus may output the enhanced video as a final restored video or add the enhanced video to the restored video to output a resultant video as a final restored video.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

600: encoder
610: decoder
802: perceptual quality pre-processor
804: perceptual model analyzer
806: perceptual model estimator
812: perceptual quality enhancer

What is claimed is:

1. A video decoding method performed by a video decoding apparatus, the video decoding method comprising:
generating a restored video by decoding a bitstream;
decoding parameters of a perceptual model from the bitstream, wherein the perceptual model is a model reflecting perceptual visual characteristics in terms of perceptual quality;
generating an enhanced video by post-processing the restored video using the parameters of the perceptual model; and
generating a final restored video using the enhanced video and the restored video,
wherein the perceptual model is a just noticeable distortion (JND) model, and the parameters of the perceptual model include a threshold value of a pixel value of the restored video in terms of perceptual quality, and
wherein the threshold value indicates a maximum value to which the pixel value of the restored video is able to be changed in terms of perceptual quality.

2. The video decoding method of claim 1, wherein the perceptual visual characteristics includes all or some of a contrast sensitivity function (CSF) effect, a contrast masking (CM) effect, a texture masking (TM) effect, or a luminance adaptation (LA) effect.

3. The video decoding method of claim 1, wherein the perceptual model is a model selected as a model suitable for correspondence to a dominant characteristic among the perceptual visual characteristics.

4. The video decoding method of claim 1, wherein the parameters of the perceptual model further include a video quality compensation method corresponding to the perceptual model.

5. The video decoding method of claim 1, wherein generating the enhanced video includes:
applying an operation to the restored video according to a video quality compensation method within a threshold value limit, and
wherein the operation is filtering, convolution operation, or change of pixel values using offset.

6. The video decoding method of claim 1, wherein generating the enhanced video includes:
splitting the restored video into N×N square blocks; and
post-processing the restored video per N×N square block basis.

7. The video decoding method of claim 1, wherein generating the final restored video includes:
outputting the enhanced video as the final restored video or outputting a video resulted by adding the enhanced video to the restored video as the final restored video.

8. A video encoding method performed by a video encoding apparatus, the video encoding method comprising:
determining removable elements according to a perceptual model by analyzing an input video in terms of perceptual quality, wherein the perceptual model is a model reflecting perceptual visual characteristics in terms of perceptual quality;
estimating parameters of the perceptual model;
pre-processing the input video by removing the removable elements from the input video using the parameters of the perceptual model;
generating a bitstream by encoding the pre-processed input video; and
encoding the parameters of the perceptual model and combining the encoded parameters with the bitstream,
wherein the perceptual model is a just noticeable distortion (JND) model,
wherein estimating parameters includes:
selecting a video quality compensation method corresponding to the perceptual model; and
deriving a threshold value of a pixel value of the input video in terms of perceptual quality, and
wherein the threshold value is a maximum value to which the pixel value of the input video is able to be changed in terms of perceptual quality.

9. The video encoding method of claim 8, wherein the perceptual visual characteristics includes all or some of a contrast sensitivity function (CSF) effect, a contrast masking (CM) effect, a texture masking (TM) effect, or a luminance adaptation (LA) effect.

10. The video encoding method of claim 8, wherein determining the removable elements includes:
analyzing the input video to determine a dominant characteristic among the perceptual visual characteristics; and
selecting a model suitable for correspondence to the dominant characteristic as the perceptual model.

11. The video encoding method of claim 8, wherein pre-processing the input video includes:
applying an operation to the input video within a threshold value limit, and
wherein the operation is filtering, convolution operation, or change of pixel values using offset.

12. The video encoding method of claim 8, wherein the parameters of the perceptual model include the threshold value and the video quality compensation method.

13. A method for providing a video decoding device with video data, the method comprising:
encoding the video data into a bitstream; and
transmitting the bitstream to the video decoding device,
wherein the encoding of the video data comprises:
determining removable elements according to a perceptual model by analyzing an input video in terms of perceptual quality, wherein the perceptual model is a model reflecting perceptual visual characteristics in terms of perceptual quality;
estimating parameters of the perceptual model;
pre-processing the input video by removing the removable elements from the input video using the parameters of the perceptual model;
generating a bitstream by encoding the pre-processed input video; and
encoding the parameters of the perceptual model and combining the encoded parameters with the bitstream,
wherein the perceptual model is a just noticeable distortion (JND) model,
wherein estimating parameters includes:
selecting a video quality compensation method corresponding to the perceptual model; and
deriving a threshold value of a pixel value of the input video in terms of perceptual quality, and
wherein the threshold value is a maximum value to which the pixel value of the input video is able to be changed in terms of perceptual quality.

* * * * *